United States Patent
Bhatia et al.

(10) Patent No.: US 11,099,264 B2
(45) Date of Patent: Aug. 24, 2021

(54) VARIABLE RANGE AND FRAME-RATE RADAR OPERATION FOR AUTOMATED VEHICLE

(71) Applicant: Motional AD LLC, Boston, MA (US)

(72) Inventors: Gaurav Bhatia, Pittsburgh, PA (US); Junqing Wei, Bridgeville, PA (US); Wenda Xu, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 232 days.

(21) Appl. No.: 15/709,647

(22) Filed: Sep. 20, 2017

(65) Prior Publication Data

US 2019/0086529 A1 Mar. 21, 2019

(51) Int. Cl.
| | |
|---|---|
| *G01S 13/06* | (2006.01) |
| *G01S 13/12* | (2006.01) |
| *G01S 13/931* | (2020.01) |
| *G01S 13/26* | (2006.01) |
| *G05D 1/02* | (2020.01) |
| *G01S 13/00* | (2006.01) |

(52) U.S. Cl.
CPC ............ *G01S 13/06* (2013.01); *G01S 13/12* (2013.01); *G01S 13/26* (2013.01); *G01S 13/931* (2013.01); *G05D 1/0257* (2013.01)

(58) Field of Classification Search
CPC ........ G01S 13/06; G01S 13/12; G01S 13/931; G01S 13/26; G01S 13/24; G01S 13/003; G05D 1/0257; G05D 1/0214
See application file for complete search history.

(56) References Cited

U.S. PATENT DOCUMENTS

| | | | | |
|---|---|---|---|---|
| 4,642,641 | A * | 2/1987 | Campbell | ............... G01S 13/12 342/137 |
| 5,587,929 | A * | 12/1996 | League | ................. G01S 13/931 342/159 |

(Continued)

FOREIGN PATENT DOCUMENTS

WO   WO2013/083118 A1 *   6/2013   ........... G01S 13/931

OTHER PUBLICATIONS

M. I. Skolnik, "Introduction to Radar Systems," second edition; McGraw-Hill Book Company; New York, NY, USA; section 4.3, pp. 114-117; copyright in the year 1980. (Year: 1980).*

(Continued)

*Primary Examiner* — Bernarr E Gregory
(74) *Attorney, Agent, or Firm* — Fish & Richardson P.C.

(57) ABSTRACT

A radar system for an automated vehicle includes a digital-map, a radar, and a controller. The digital-map indicates a characteristic of a roadway traveled by a host-vehicle. The radar detects objects proximate to the host-vehicle. The radar is equipped with a range-setting that is selectively variable. The controller is in communication with the digital-map and the radar. The controller is configured to select the range-setting of the radar based on the characteristic of the roadway. The characteristic may be based on speed-limit, road-shape (e.g. curve-radius), a horizon-distance, and/or an obstruction (e.g. hill, sign, or building). The radar may be equipped with a frame-rate-setting (i.e. pulse repetition frequency or PRF) that is selectively variable, and the controller may be further configured to select the frame-rate-setting based on the characteristic of the roadway.

17 Claims, 2 Drawing Sheets

(56) References Cited

U.S. PATENT DOCUMENTS

| | | | |
|---|---|---|---|
| 7,349,771 B2* | 3/2008 | Sakuma | G01S 13/931 701/1 |
| 7,400,290 B2 | 7/2008 | Woodington et al. | |
| 8,912,946 B2* | 12/2014 | Yanagihara | G01S 13/003 342/22 |
| 9,268,332 B2* | 2/2016 | Montemerlo | G05D 1/0214 |
| 9,568,611 B2* | 2/2017 | Cosatto | G01S 13/931 |
| 9,840,256 B1* | 12/2017 | Valois | G01S 13/931 |
| 10,203,409 B2* | 2/2019 | Bueschenfeld | G01S 13/931 |
| 2002/0130810 A1* | 9/2002 | Gottwald | G01S 13/24 342/159 |
| 2016/0003938 A1 | 1/2016 | Gazit et al. | |
| 2017/0254880 A1 | 9/2017 | Smith | |

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

International Search Report and Written Opinion in International Application No. PCT/US2018/51902 dated Dec. 4, 2018, 9 pages.

PCT International Preliminary Report on Patentability in International Appln. No. PCT/US2018/051902, dated Apr. 2, 2020, 8 pages.

\* cited by examiner

VARIABLE RANGE AND FRAME-RATE RADAR OPERATION FOR AUTOMATED VEHICLE

TECHNICAL FIELD OF INVENTION

This disclosure generally relates to a radar system for an automated vehicle, and more particularly relates to a system that selects a range-setting of the radar based on a characteristic of a roadway traveled by a host-vehicle.

BACKGROUND OF INVENTION

Automotive radars with an adjustable range-setting, an adjustable field-of-view, and/or an adjustable frame-rate (i.e. pulse repetition frequency or PRF) are known. However, a radar system that determines how to make the best use of these adjustable features is needed.

SUMMARY OF THE INVENTION

In accordance with one embodiment, a radar system for an automated vehicle is provided. The system includes a digital-map, a radar, and a controller. The digital-map indicates a characteristic of a roadway traveled by a host-vehicle. The radar detects objects proximate to the host-vehicle. The radar is equipped with a range-setting that is selectively variable. The controller is in communication with the digital-map and the radar. The controller is configured to select the range-setting of the radar based on the characteristic of the roadway.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
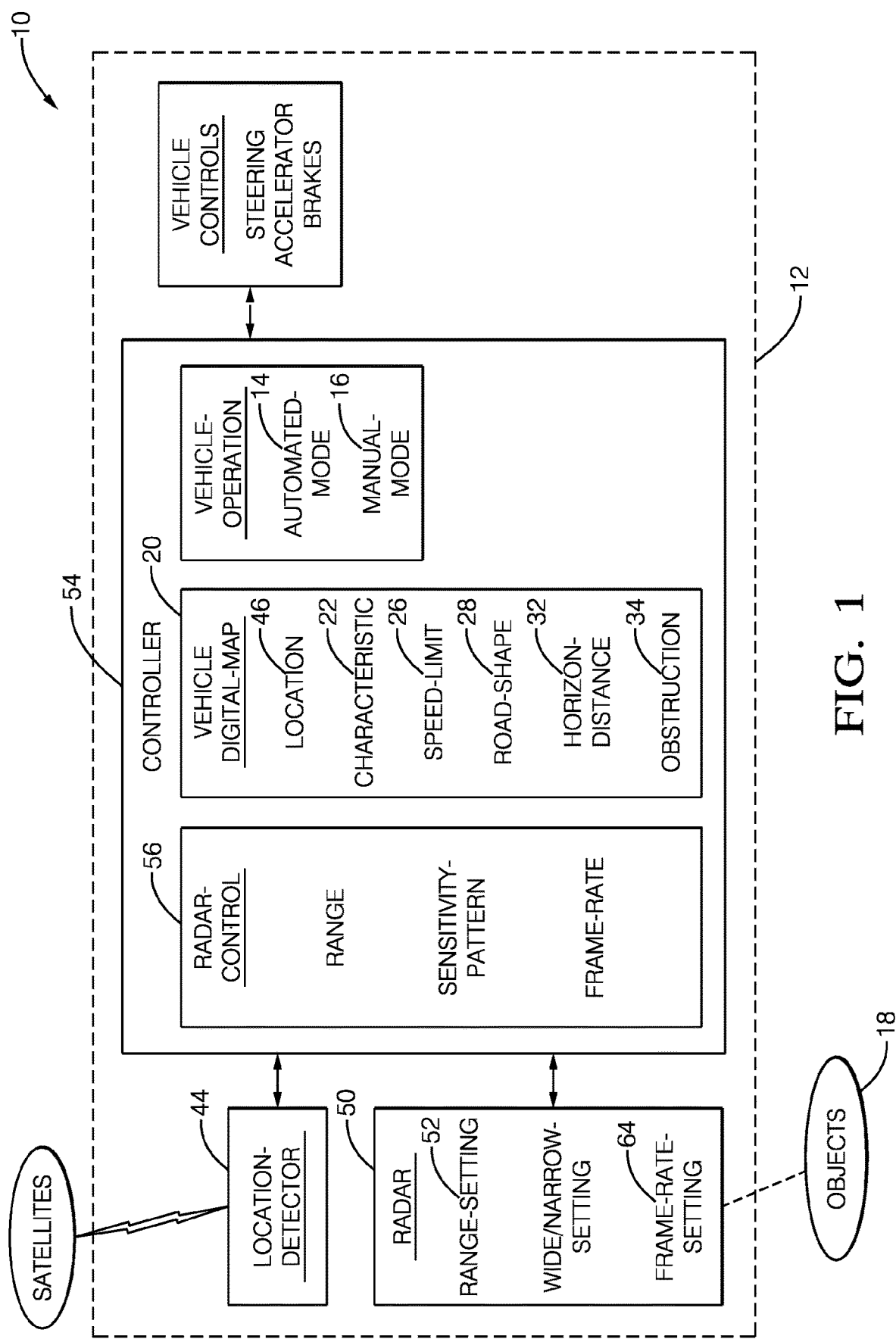
FIG. 1 is diagram of a radar system in accordance with one embodiment.

FIG. 1 illustrates a non-limiting example of a radar system 10, hereafter referred to as the system 10, which for an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, instances of objects 18 such as another-vehicle, a pedestrian, or a road sign.

Figure 2:
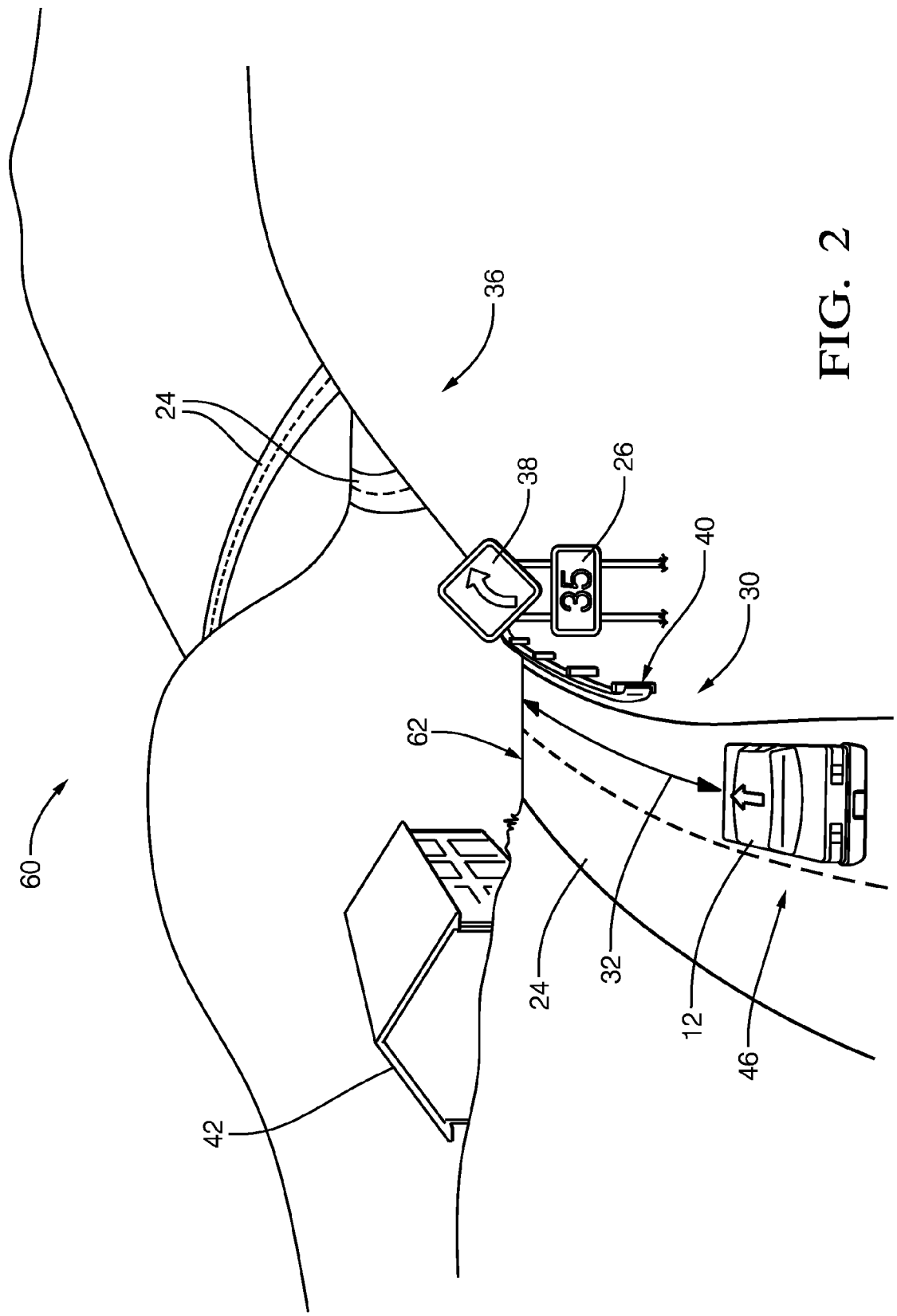
FIG. 2 is a traffic-scenario encountered by the system of FIG. 1 in accordance with one embodiment.

The system 10 includes a digital-map 20 that indicates a characteristic 22 of a roadway 24 (FIG. 2) traveled by a host-vehicle 12. While FIG. 1 may be interpreted to suggest that the digital-map 20 is on-board the host-vehicle 12, this is not a requirement. It is contemplated that the digital-map 20 could reside 'in the cloud' and be accessed or updated by the system 10 using, for example, wireless communications such as a cellular-phone network or Wi-Fi. As used herein, the characteristic 22 of the roadway 24 may be based on or indicative of, but not limited to, a speed-limit 26 of the roadway 24. The characteristic 22 of the roadway 24 may also be is based on or indicative of a road-shape 28 of the roadway 24, for example a radius and/or camber of curve 30 (FIG. 2). The characteristic 22 of the roadway 24 may also be is based on or indicative of a horizon-distance 32 (see also FIG. 2) from the host-vehicle 12, beyond which on-board sensors (e.g. radar, camera, lidar) may not be able to detect instances of the objects 18. The digital-map 20 may also indicate the presence of an obstruction 34 such as a hill 36, a sign 38, or a guardrail 40 that may obstruct the field-of-view of one or more of the on-board sensors. The digital-map 20 may also indicate the presence of a building 42 from which other vehicles (not show) may be entering or exiting the roadway 24 from a location beyond the horizon-distance 32. The usefulness of this information from the digital-map 20 will become apparent later in this document.

The system 10 may include a location-detector 44 that indicates a location 46 of the host-vehicle 12 on the digital-map 20. The location-detector 44 may be a global-positioning-system (GPS) receiver that provides coordinates of the host-vehicle 12 based on signals received from satellites, as will be recognized by those in the art. Alternatively, it is contemplated that on-board sensors such as a camera (not shown) may be used 'read' street-signs and/or detect other unique features of the landscape around the host-vehicle 12 to determine the location 46 on the digital-map 20.

The system 10 includes a radar 50 that detects instances of the objects 18 proximate to the host-vehicle 12. Examples of radar devices with fixed performance characteristics such as fixed emitted signal strength, fixed detection sensitivity, fixed field-of-view (i.e. fixed sensitivity-pattern) are well-known in the automotive sensor field. However, the radar 50 used in the system 10 has at least one instance of a performance characteristic that is selectively adjustable or selectively variable by a user of the radar. By way of example and not limitation, the radar 50 of the system 10 described herein may be advantageously equipped or configured with a range-setting 52 that is selectively variable. Variation of the range-setting 52 may be influenced by a number of factors such as, but not limited to: the amount of transmit-power emitted by the radar 50 to 'illuminate' instance of the objects 18; the detection-threshold used by the receiver portion of the radar 50 to detect reflections of the transmitted-signal; and/or the beam-width of the detection-antenna selected for use by the radar 50. The radar 50 may also be configured or designed to be able to 'steer' the radar-beam emitted by the radar 50 to focus the transmitted-signal in a particular direction.

In order to take advantage of the adjustable or variable nature of the radar 50 used by the system 10 described herein, the system 10 includes a controller 54 in communication with the digital-map 20 and the radar 50. The communication may be by way of wires, fiber-optics, or wireless communication, as will be recognized by those in the art. The controller 54 may include a processor (not specifically shown) such as a microprocessor or other control circuitry such as analog and/or digital control circuitry including an application specific integrated circuit (ASIC) for processing data as should be evident to those in the art. The controller 54 may include memory (not specifically shown), including non-volatile memory, such as electrically erasable programmable read-only memory (EEPROM) for storing one or more routines, thresholds, and captured data. The one or more routines may be executed by the processor to perform steps for determining which controllable or variable aspects of the radar 50 should be varied by a radar-control 56 of the controller 54 based on signals received by the controller 54 from the radar 50 and other devices as described herein.

By way of example, the controller 54 may be configured to select the range-setting 52 of the radar 50 based on the characteristic 22 of the roadway 24 indicated by the digital-map 20. For example, if the speed-limit 26 is relatively fast, one-hundred-kilometers-per-hour (100 kph) for example, and the landscape about the roadway 24 is relatively uncluttered, the range-setting 52 may be selected so more distant instances of the objects 18 can be detected. By contrast, if the host-vehicle 12 is operating in an urban setting with numerous instances of the objects 18 (e.g. lots of traffic), and the speed-limit 26 is relatively slow, thirty-five-kilometers-per-hour (35 kph) for example, the range-setting 52 may be selected so only nearby instances of the objects 18 are detected.

In order for the controller 54 to make this selection, information from the digital-map 20 may be used to help determine which setting is preferable. The digital-map 20 may include direct information about how the radar 50 should be operated, e.g. what the range-setting 52 should be used when the host-vehicle is at the location 46. Alternatively, the controller 54 may need to analyze various information about the roadway 24 proximate to (within 100 meters) the host-vehicle 12 such as, but not limited to, the road-shape 28 (e.g. curved vs. straight, hilly vs. flat), and/or the horizon-distance 32, i.e. what is the distance beyond which instances of the objects 18 are likely not detected because of obstruction by the landscape.

FIG. 2 illustrates a non-limiting example of a traffic-scenario 60 that the host-vehicle 12 may encounter while equipped with the system 10. The host-vehicle 12 is approaching a horizon-line 62 that is measured to be the horizon-distance 32 from the host-vehicle 12. The position of the horizon-line 62 relative to the host-vehicle 12 may be determined using the radar 50, possibly in combination with other on-board sensors such as a lidar (not shown) and/or a camera (not shown). Alternatively, the relative position of the horizon-line 62 and/or the horizon-distance 32 may be indicated by the digital-map 20 based on the location 46 of the host-vehicle 12 on the digital-map 20.

Given the horizon-distance 32 and/or the relative position of the horizon-line 62, the controller 54 may use the radar-control 56 to make adjustments so any object that suddenly appears from beyond the horizon-line 62 is more quickly detected and/or classified. For example, the radar 50 may be further equipped with a frame-rate-setting 64 (i.e. pulse repetition frequency or PRF) that is selectively variable. For example, the radar 50 may be adjustable from ten-frames-per-second (10 fps) to sixty-frames-per-second (60 fps). At 10 pfs the controller 54 may not be processing burdened by the amount of data coming from the radar 50. However, at 60 pfs the controller 54 may be processing burdened by the amount of data coming from the radar 50, so this relatively high value for the frame-rate-setting 64 may only be used for a few seconds before the controller 54 begins to ignore data from other sensors on the host-vehicle 12. As such, the controller 54 may be further configured to select the frame-rate-setting 64 based on the characteristic 22 of the roadway 24.

Accordingly, a radar system (the system 10), a controller 54 for the system 10, and a method of operating the system 10 is provided. The system 10 makes optimum use of variable or adjustable performance characteristics of the radar 50 based on information from the digital-map 20 and/or information about the landscape proximate to the host-vehicle from other on-board sensors.

While this invention has been described in terms of the preferred embodiments thereof, it is not intended to be so limited, but rather only to the extent set forth in the claims that follow.

We claim:

1. A system within a host-vehicle, the system comprising:
    a radar having a plurality of selectively variable settings of at least one of a frame-rate or a pulse repetition frequency; and
    a controller comprising:
        a digital map that indicates a characteristic of a roadway traveled by the host-vehicle; and
        a radar-control module in communication with the digital map and the radar, the controller configured to select a setting of at least one of the frame-rate or the pulse repetition frequency from the plurality of settings based on the characteristic of the roadway,
    wherein the at least one of the frame-rate or the pulse repetition frequency of the radar is adjusted to the selected setting.

2. The system in accordance with claim 1, wherein the system includes a location-detector that indicates a location of the host-vehicle on the digital map.

3. The system in accordance with claim 1, wherein the characteristic of the roadway is indicated by or based on a shape of the roadway.

4. The system in accordance with claim 1, wherein the characteristic of the roadway is indicated by or based on a distance between a horizon-line and the host-vehicle, and the radar-control module is configured to select a setting of at least one of the frame-rate or the pulse repetition frequency from the plurality of settings based on the distance.

5. The system in accordance with claim 1, wherein radar al-se has a plurality of selectively variable settings for a range of the radar, and the radar-control module is further configured to select a setting for the range of the radar from the plurality of settings for the range of the radar based on the characteristic of the roadway.

6. The system in accordance with claim 5, wherein the characteristic of the roadway is indicated by or based on a speed-limit for the roadway and a landscape about the roadway, and the radar-control module is configured to select the setting for the range of the radar based on the speed-limit and the landscape.

7. The system in accordance with claim 5, wherein the setting for the range, the frame rate, or the pulse repetition frequency is selected by the radar-control module according to a location of the host vehicle on the digital map.

8. The system in accordance with claim 5, wherein selection of the setting for the range, the frame rate, or the pulse repetition frequency is based on an amount of transmit-power of a transmitted signal emitted by the radar to illuminate an object, a detection threshold used by a receiver portion of the radar to detect reflections of the transmitted signal, and a beam-width of a detection antenna selected for use by the radar.

9. The system in accordance with claim 1, wherein the radar is configured to steer a radar beam emitted by the radar to focus a transmitted-signal in a particular direction.

10. A method comprising:
determining, by controller of a host-vehicle, a characteristic of a roadway traveled by the host-vehicle, wherein the characteristic of the roadway comprises a shape of the roadway, a distance between a horizon-line and the host vehicle, a speed-limit for the roadway, and a landscape about the roadway; and
determining, by the controller, a frame-rate-setting or a pulse repetition frequency of a radar of the host-vehicle based on the determined characteristic of the roadway.

11. The method in accordance with claim 10, wherein the characteristic of the roadway further comprises a position of a horizon-line relative to the host-vehicle.

12. The method in accordance with claim 10, wherein the radar has a range-setting that is selected by the controller based on the characteristic of the roadway.

13. The method in accordance with claim 12, further comprising:
determining a location of the host-vehicle on a digital map; and
selecting the range setting or frame-rate-setting or pulse repetition frequency according to the location of the host vehicle on the digital map.

14. The method in accordance with claim 12, wherein selecting the range-setting or the frame-rate-setting or the pulse repetition frequency is influenced by at least one of an amount of transmit-power of a transmitted signal emitted by the radar to illuminate an object, a detection threshold used by a receiver portion of the radar to detect reflections of the transmitted signal or a beam-width of a detection antenna selected for use by the radar.

15. The method in accordance with claim 10, further comprising:
steering a radar beam emitted by the radar to focus a transmitted-signal in a particular direction.

16. A non-transitory, computer-readable storage medium having instructions stored thereon, that when executed by a controller of a host vehicle, cause the controller to perform operations comprising:
determining, by the controller of the host-vehicle, a characteristic of a roadway traveled by the host-vehicle, wherein the characteristic of the roadway comprises one or more of a shape of the roadway, a distance between a horizon-line and the host vehicle, a speed-limit for the roadway, or a landscape about the roadway; and
determining, by the controller, a frame-rate-setting or a pulse repetition frequency of a radar of the host-vehicle based on the determined characteristic of the roadway.

17. A system within a host-vehicle, the system comprising:
a radar of the host-vehicle having a plurality of selectively variable settings of at least one of a frame-rate or a pulse repetition frequency; and
a controller of the host-vehicle comprising:
a digital map that indicates a characteristic of a roadway traveled by the host-vehicle, wherein the characteristic of the roadway comprises a shape of the roadway, a distance between a horizon-line and the host vehicle, a speed-limit for the roadway, and a landscape about the roadway; and
a radar-control module in communication with the digital map and the radar, the controller configured to select a setting of at least one of the frame-rate or the pulse repetition frequency from the plurality of settings based on the shape of the roadway, the distance between the horizon-line and the host vehicle, the speed-limit for the roadway, and the landscape about the roadway.

* * * * *